US009080136B2

(12) United States Patent
Mortimer et al.

(10) Patent No.: US 9,080,136 B2
(45) Date of Patent: Jul. 14, 2015

(54) BIODEGRADABILITY OF ANTISCALANT FORMULATIONS

(75) Inventors: David A. Mortimer, West Yorkshire (GB); Robert J. Jackson, North Yorkshire (GB); Sun-Yi Huang, Stamford, CT (US)

(73) Assignee: Kemira OYJ, Helsinki (FI)

( * ) Notice: Subject to any disclaimer, the term of this patent is extended or adjusted under 35 U.S.C. 154(b) by 888 days.

(21) Appl. No.: 12/096,123

(22) PCT Filed: Dec. 19, 2006

(86) PCT No.: PCT/US2006/048301
§ 371 (c)(1),
(2), (4) Date: Jun. 4, 2008

(87) PCT Pub. No.: WO2007/075603
PCT Pub. Date: Jul. 5, 2007

(65) Prior Publication Data
US 2009/0048142 A1 Feb. 19, 2009

Related U.S. Application Data

(60) Provisional application No. 60/753,901, filed on Dec. 22, 2005.

(51) Int. Cl.
*C11D 3/37* (2006.01)
*C02F 5/12* (2006.01)
*C02F 5/14* (2006.01)
*C23F 14/02* (2006.01)
*C09K 8/528* (2006.01)
*C02F 103/10* (2006.01)

(52) U.S. Cl.
CPC . *C11D 3/378* (2013.01); *C02F 5/12* (2013.01); *C02F 5/14* (2013.01); *C09K 8/528* (2013.01); *C11D 3/3784* (2013.01); *C23F 14/02* (2013.01); *C02F 2103/10* (2013.01)

(58) Field of Classification Search
CPC .. C11D 3/378; C11D 3/3784; C02F 2103/10; C02F 5/12; C02F 5/14; C23F 14/02; C09K 8/528
USPC .......... 252/175, 180; 210/698, 699, 700, 701; 528/373, 391; 524/415, 425; 525/329.5, 329.6
See application file for complete search history.

(56) References Cited

U.S. PATENT DOCUMENTS

| 2,847,403 | A | * | 8/1958 | Contois, Jr. | 525/380 |
| 3,296,166 | A | * | 1/1967 | Whitby | 524/522 |
| 3,706,717 | A | | 12/1972 | Siegele | |
| 3,879,288 | A | * | 4/1975 | Siegele | 210/701 |
| 4,518,511 | A | | 5/1985 | Kaufman et al. | |
| 4,581,145 | A | * | 4/1986 | Cuisia et al. | 210/699 |
| 4,725,655 | A | * | 2/1988 | Denzinger et al. | 526/65 |
| 4,973,775 | A | * | 11/1990 | Sugier et al. | 585/15 |
| 5,064,563 | A | | 11/1991 | Yamaguchi et al. | |
| 5,298,570 | A | | 3/1994 | Tahara et al. | |
| 5,352,365 | A | * | 10/1994 | Fuller | 210/699 |
| 5,962,401 | A | | 10/1999 | Yamaguchi et al. | |
| 2002/0049147 | A1 | * | 4/2002 | Saeki et al. | 510/337 |
| 2003/0146173 | A1 | * | 8/2003 | Rivers et al. | 210/749 |
| 2004/0063588 | A1 | * | 4/2004 | Rose et al. | 507/103 |

FOREIGN PATENT DOCUMENTS

| CN | 1621362 | * | 6/2005 | C02F 5/12 |
| EP | 0595640 | * | 4/1997 | C10L 1/32 |
| EP | 0798320 A2 | * | 10/1997 | C08F 222/00 |
| EP | 0798320 A2 | | 6/2008 | |

OTHER PUBLICATIONS

Michaud et al. Water Conditioning and Purification, Jan. 1990 p. 44-51.*
J. Floor Anthoni © 2000 and 2006; Composition of Seawater SeaFriends {seafriends.org.nz/ociano/seawater.htm}.*
Jarrett et al Technical Conferene 2004 AADE-04-DF-HO-31 (C) 2004 Houston TX Apr. 6-7 {American Assoiciation of Drilling Engineers}.*
FR2723750A1; Feb. 23, 1996; Machine Translation (27 pages).
Lewis et al., "Environmentally Acceptable Fluid-Loss Alternatives for Use in the North Sea", Fall 2004, SPE ATCE (8 pages).
UK Guidelines on Interpreting the Requirements of the OSPAR Harmonised Offshore Chemical Notification Format, 2001 (10 pages).
"Summary of Findings of the Ring Test for Biodegradation of Chemicals in the Marine Environment", Oslo and Paris Conventions for the Prevention of Marine Pollution, Working Group on Sea-Based Activities (SEBA), Biarritz: Feb. 17-21, 1997 (2 pages).
OSPAR Guidelines for Completing the Harmonised Offshore Chemical Notification Format (HOCNF), Reference No. 2003-1), Ospar Convention for the Protection of the Marine Environment of the North East Atlantic, Meeting of the Offshore Industry Committee (OIC), London (Secretariat): Mar. 10-14, 2003 (10 pages).
OSPAR Guidelines for Completing the Harmonised Offshore Chemical Notification Format (HOCNF), Reference No. 2005-13), 2005 (10 pages).
Richterich, K. et al., "The 'two-phase closed bottle test'—a suitable method for the determination of 'ready biodegradability' of poorly soluble compounds", Chemosphere, Jul. 1998, 37(2), Abstract Only (1 page).
Nyholm et al., "Screening methods for assessment of biodegradability of chemicals in seawater—results from a ring test.", Exotoxicol Environ Saf., Apr. 1992, 23(2), Abstract Only (2 pages).
"Biodegradability in Seawater", OECD Guideline for Testing of Chemicals, Adopted by the Council on Jul. 17, 1992, (27 pages).
International Search Report; International Application No. PCT/US2006/048301; Date of Actual Completion of the International Search Jun. 26, 2007; Date of Mailing of the International Search Report Jul. 2, 2007; 4 pages.
FR2723750; Feb. 23, 1996; Abstract Only (1 page).

* cited by examiner

Primary Examiner — Patrick Ryan
Assistant Examiner — Aaron Greso
(74) Attorney, Agent, or Firm — King & Spalding

(57) ABSTRACT

Anionic polymers comprising. organic counterfoils exhibit improved biodegradability. The anionic polymers are useful as antiscalants. The biodegradability of an anionic polymer may be improved by replacing inorganic counterions with organic counterions.

40 Claims, No Drawings

BIODEGRADABILITY OF ANTISCALANT FORMULATIONS

CROSS REFERENCE TO RELATED APPLICATIONS

This is a U.S. national stage of application No. PCT/US2006/048301, filed on 19 Dec. 2006. Priority under 35 U.S.C. §119(a) and 35 U.S.C. §365(b) is claimed from United States Application No. 60/753,901, filed 22 Dec. 2005, the disclosure of which is also incorporated herein by reference.

BACKGROUND OF THE INVENTION

1. Field of the Invention

This invention relates to antiscalants having improved biodegradability. Such antiscalants are useful in a variety of applications, including boiling and cooling water scale prevention, desalination, struvite control and oilfield applications.

2. Description of the Related Art

Biodegradability of antiscale agents used in the oil and gas industry is of particular concern. See, e.g., S. Lewis and M. Szymanski, "Environmentally Acceptable Fluid-Loss Alternatives for Use in North Sea," Fall 2004 SPE ATCE (Abstract). For example, Norway strongly favors the use of anti-scale products for North Sea oil well applications that have relatively high biodegradability in seawater. Various test protocols for determining biodegradability are known, including the test method known as "Marine BODIS." According to the "OSPAR Guidelines for Completing the Harmionised Offshore Chemical Notification Format (HOCNF) (Reference number: 2005-13), substances for which no biodegradation data are available shall be tested according to the standard test methods for biodegradability: OECD Guidelines for Testing of Chemicals, 1992, 306, or any of the four protocols published in the report "Biodegradability of chemicals in sea water. Results of a ring tests undertaken by OSPARCOM, were reported by Elf Akvamiljö, September 1996." According to the United Kingdom Guidelines pertaining to the OSPAR Guidelines, the Marine BODIS method is one of the standard test methods. Biodegradability is also a concern in a variety of industrial applications outside of the oil and gas industry.

A number of polymeric antiscale agents are known. For example, U.S. Pat. Nos. 3,706,717; 3,879,288 and 4,518,511 disclose anionic polymers and methods of using them as antiscalants. However, the disclosed anionic polymers have relatively poor biodegradability. See also U.S. Pat. Nos. 5,064,563; 5,298,570; and 5,962,401. Anionic polymers carry a negative charge that is neutralized by positively charged counterions. The anionic polymer is generally considered to be the primary active ingredient in the polymeric antiscale agent, whereas the counterion is often regarded as a neutral or inactive species. Consequently, prior to the invention described below, relatively low molecular weight counterions such as sodium and potassium were generally considered desirable in order to maximize the active solids content of the antiscale agent and/or to minimize costs. Organic counterions such as alkylammonium species were generally considered undesirable because their relatively high molecular weights reduced the active solids content of the antiscale agent, and because of their relatively high costs as compared to counterions such as sodium and potassium.

There is a need for antiscale agents having improved biodegradability, as well as methods of improving the biodegradability of existing antiscale agents.

SUMMARY OF THE INVENTION

It has now been discovered that the biodegradability of anionic polymers can be improved by replacing the metal counterion with an organic counterion. Thus, an embodiment provides an antiscale agent comprising an anionic polymer, the anionic polymer comprising recurring units of the formula (I) and recurring units of the formula (II):

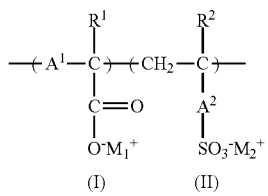

wherein:
$A^1$ is —$CH_2$— or a group of the formula (III):

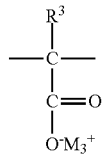

$A^2$ is —$CH_2$—, —$C(=O)NHC(CH_3)_2CH_2$—, or a bond;
$R^1$, $R^2$ and $R^3$ are each individually —$CH_3$ or —H; and
at least one of $M_1^+$, $M_2^+$ and $M_3^+$ is an organic cation, the organic cations represented by $M_1^+$, $M_2^+$ and $M_3^+$ together being present in an amount that is effective to increase the biodegradability of the anionic polymer relative to a comparable anionic polymer in which $M_1^+$, $M_2^+$ and $M_3^+$ are inorganic cations.

Another embodiment provides an antiscale agent comprising an anionic polymer, the anionic polymer comprising recurring units of the formula (I) and recurring units of the formula (II):

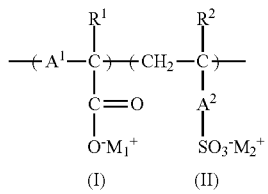

wherein:
$A^1$ is —$CH_2$— or a group of the formula (III):

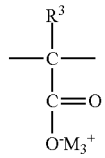

$A^2$ is —$CH_2$—, —$C(=O)NHC(CH_3)_2CH_2$—, or a bond; $R^1$, $R^2$ and $R^3$ are each individually —$CH_3$ or —H; and at least one of $M_1^+$, $M_2^+$ and $M_3^+$ is an organic cation, the organic cations represented by $M_1^+$, $M_2^+$ and $M_3^+$ together being present in an amount of at least about 5 mole %, based on total moles of the recurring units of the formulae (I) and (II).

Another embodiment provides a method for treating scale, comprising adding an antiscale agent as described herein to an aqueous system in need of scale treatment, in an amount effective to reduce or inhibit scale in the aqueous system.

Another embodiment provides a method of increasing the biodegradability of an anionic polymer, comprising: selecting an anionic polymer that comprises at least one anionic recurring unit and at least one inorganic counterion, the anionic polymer having a first degree of biodegradability; and preparing a modified version of the anionic polymer in which at least a portion of the inorganic counterion is replaced by an organic counterion, the modified version having a second degree of biodegradability that is higher than the first degree of biodegradability.

These and other embodiments are described in greater detail below.

DETAILED DESCRIPTION OF THE PREFERRED EMBODIMENTS

Definitions

As used herein, the terms "polymer," "polymers," "polymeric" and similar terms are used in their ordinary sense as understood by one skilled in the art, and thus may be used herein to refer to or describe a large molecule (or group or mixture of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. A polymer has a weight average molecular weight of about 500 or greater, and thus may be an oligomer.

"Anionic" polymers are polymers that contain anionic or negatively charged groups that are attached to the polymer. Examples of anionic groups include without limitation carboxylate, sulfonate and phosphonate. The anionic groups are typically associated with cations or positively charged counterions. Examples of cations include H+, Na+, and K+. In aqueous solutions, the association between the anionic group and the cation is typically a function of pH, in a manner understood by those skilled in the art.

As used herein, the terms "antiscalant", "antiscalants", "antiscale agent," "scale inhibitor" and similar terms are used in their ordinary sense as understood by one skilled in the art, and thus may be used herein to refer to or describe chemical compounds or compositions containing such compounds, where the compounds, when added to an aqueous system, reduce the amount of scale and/or rate of formation of scale in the aqueous system, as compared to a system that does not contain the added chemical compound or composition. In this context, the term "scale" refers to insoluble substances such as insoluble salts, including without limitation sulfate, carbonate and phosphate salts such as calcium carbonate, calcium sulfate, calcium phosphate, barium sulfate, strontium sulfate, vivianite, and struvite, that have a tendency to form in aqueous systems such as boiler water, cooling water, seawater (e.g., in oil platform applications), brackish water, oilfield water, municipal treatment plant water, and industrial treatment plant water.

Antiscale Agents

An embodiment provides an antiscale agent comprising an anionic polymer, the anionic polymer comprising recurring units of the formula (I) and recurring units of the formula (II):

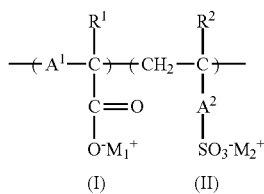

In formula (I), $A^1$ is —$CH_2$— or a group of the formula (III):

In formula (II), $A^2$ is —$CH_2$—, —$C(=O)NHC(CH_3)_2CH_2$—, or a bond. In formulae (I) and (II), $R^1$, $R^2$ and $R^3$ are each individually —$CH_3$ or —H, and at least one of $M_1^+$, $M_2^+$ and $M_3^+$ is an organic cation. The recurring units of the formula (I) and the recurring units of the formula (II) are preferably present in a molar ratio in the range of from about 1:99 to about 99:1, more preferably in the range of from about 9:1 to 1:9. In an embodiment, the recurring units of the formula (I) and the recurring units of the formula (II) are present in a molar ratio of about 1:1.

In addition to the recurring units of the formula (I) and recurring units of the formula (II), the anionic polymer may further comprise recurring units of the formula (IV):

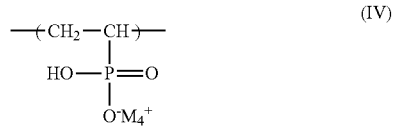

wherein $M_4^+$ is $H^+$, $NH_4^+$, or an organic cation, or recurring units of dialkyl allyl phosphonate of the formula (V):

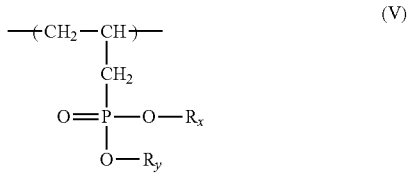

wherein $R_x$ and $R_y$ are $C_1$-$C_4$ alkyl. One example of dialkyl allyl phosphonate is diethyl allyl phosphonate.

The molar ratio of the recurring units of the formula (IV) to the sum of the recurring units of the formulae (I) and (II) is preferably in the range of from about 1:99 to about 1:3. The anionic polymer has a weight average molecular weight of about 500 or greater, preferably in the range of about 500 to about 50,000, more preferably in the range of about 1,000 to about 50,000. For example, the polymers described in the examples below have a weight average molecular weight in the range of about 1,000 to about 2,000. The anionic polymer may be linear, branched, or crosslinked, and water-soluble or water-insoluble. In a preferred embodiment, the anionic polymer is water-soluble.

Examples of suitable organic cations include without limitation $^+NH_3R^4$, $^+NH_2(R^4)(R^5)$, $^+NH(R^4)(R^5)(R^6)$ and $^+N(R^4)(R^5)(R^6)(R^7)$, where $R^4$, $R^5$, $R^6$ and $R^7$ are each individually —$C_nH_{2n}R^8$, where n is an integer in the range of 1 to 10 and wherein $R^8$ is —H or —OH. In some embodiments, one or more of $M_1^+$, $M_2^+$, $M_3^+$ and $M_4^+$ is an inorganic cation such as $H^+$, $NH_4^+$, and/or a metal ion (such as $Na^+$ or $K^+$) so long as at least one of $M_1^+$, $M_2^+$, $M_3^+$ and $M_4^+$ is an organic cation. In an embodiment, at least one of $M_1^+$, $M_2^+$, $M_3^+$ and $M_4^+$ is an organic counterion selected from the group consisting of $^+NH_3(CH_3)$, $^+NH_2(CH_3)_2$, $^+NH(CH_3)_3$, $^+NH_3(CH_2CH_3)$, $^+NH_2(CH_2CH_3)_2$, $^+NH(CH_2CH_3)_3$, $^+NH_3(CH_2CH_2OH)$, $^+NH_2(CH_2CH_2OH)_2$, $^+NH(CH_2CH_2OH)_3$ and mixtures thereof. Every possible combination of each of the choices for $A^1$, $A^2$, $R^1$, $R^2$, $R^3$, $R^4$, $R^5$, $R^6$, $R^7$, $R^8$, n, $M_1^+$, $M_2^+$, $M_3^+$ and $M_4^+$, as well as the choices described herein for the molecular weights of the polymers and the molar ratios of recurring units of the formulae (I), (II) and (IV), is contemplated and considered to be described herein, whether or not expressly set forth as such.

For example, in an embodiment, $A^2$ is —$CH_2$— or a bond. In another embodiment, $A^1$ is the group of the formula (III). In another embodiment, $A^1$ is —$CH_2$—. In another embodiment, $A^2$ is a bond. In another embodiment, at least one of $R^1$, $R^2$ and $R^3$ is H. In another embodiment, the anionic polymer is an organic salt of a hydrolyzed copolymer of maleic anhydride and at least one comonomer selected from the group consisting of allyl sulfonic acid and vinyl sulfonic acid. In another embodiment, the anionic polymer is an organic salt of a copolymer of acrylic acid and at least one comonomer selected from the group consisting of allyl sulfonic acid and vinyl sulfonic acid. In another embodiment, the anionic polymer is an organic salt of a hydrolyzed copolymer of maleic anhydride, vinyl sulfonic acid and acrylic acid. In another embodiment, the anionic polymer is an organic salt of a copolymer of itaconic acid and at least one comonomer selected from the group consisting of allyl sulfonic acid and vinyl sulfonic acid. Various specific embodiments are described in the examples below.

In an embodiment, the organic cations represented by $M_1^+$, $M_2^+$, $M_3^+$ and $M_4^+$ are together present in an amount that is effective to increase the biodegradability of the anionic polymer relative to a comparable anionic polymer in which $M_1^+$, $M_2^+$, $M_3^+$ and $M_4^+$ are inorganic cations. An increase in biodegradability may be measured in accordance with any of the standard test methods for biodegradability: OECD Guidelines for Testing of Chemicals, 1992, 306, or any of the four protocols (known to those skilled in the art as "Marine BODIS Test," "OECD Guideline 306 Closed Bottle Test," "Marine $CO_2$ Headspace Biodegradation Test," and "Marine $CO_2$ Evolution Test) described in the report "Biodegradability of chemicals in sea water. Results of a ring tests undertaken by OSPARCOM, were reported by Elf Akvamiljö, September 1996." It has been determined that each of these test methods gives comparable results. In the event that the test methods are found to give significantly different results, the Marine BODIS test is to be used to determine the biodegradability of the antiscale agents described herein. In an embodiment, the organic cations represented by $M_1^+$, $M_2^+$, $M_3^+$ and $M_4^+$ are together present in an amount that is effective to increase in biodegradability of the anionic polymer (relative to a comparable anionic polymer in which $M_1^+$, $M_2^+$, $M_3^+$ and $M_4^+$ are inorganic cations) by at least about 10%, preferably at least about 20%, more preferably at least about 30%, even more preferably at least about 50%, as determined by Marine BODIS.

In another embodiment, the organic cations represented by $M_1^+$, $M_2^+$, $M_3^+$ and $M_4^+$ are together present in an amount that is effective to provide the antiscale agent with a pH of at least about 3, preferably a pH in the range of about 3 to about 10, more preferably a pH in the range of about 5 to about 7.

In various embodiments, the organic cations represented by $M_1^+$, $M_2^+$, $M_3^+$ and $M_4^+$ are together present in an amount of at least about 5 mole %, at least about 10 mole %, at least about 20 mole %, at least about 30 mole %, at least about 40 mole %, or at least about 50 mole %, based on total moles of recurring units of the formulae (I), (II) and (IV). In an embodiment, the organic cations represented by $M_1^+$, $M_2^+$ and $M_3^+$ are together present in an amount of at least about 5 mole %, at least about 10 mole %, at least about 20 mole %, at least about 30 mole %, at least about 40 mole %, or at least about 50 mole %, based on total moles of recurring units of the formulae (I) and (II). The amount of organic cations represented by $M_1^+$, $M_2^+$, $M_3^+$ and/or $M_4^+$ and the number of moles of recurring units of the formulae (I), (II), (IV) and/or (V) may be determined by nuclear magnetic resonance (NMR) spectroscopy in a manner generally known to those skilled in the art, and/or by knowledge of the reactants and reaction conditions used to make the polymer.

In addition to the recurring units of the formula (I) and recurring units of the formula (II), the anionic polymer may optionally further comprise other recurring units. The optional recurring units may include nonionic recurring units such as acrylamide, methacrylamide, those resulting from incomplete hydrolysis of maleic anhydride recurring units, and/or hydroxyethylmethacrylate (HEMA), and/or charged recurring units such as acrylic acid, methacrylic acid, allyl sulfonic acid, sodium acrylate, sodium methacrylate, sodium allyl sulfonate, potassium acrylate, potassium methacrylate, potassium allyl sulfonate, ammonium acrylate, ammonium methacrylate, and/or ammonium allyl sulfonate. Thus, the anionic polymer (and the antiscale agent into which it is incorporated) may further comprise at least one inorganic and/or or metal cation, such as ammonium, sodium and/or potassium. Preferably, the organic cations represented by $M_1^+$, $M_2^+$, $M_3^+$ and $M_4^+$ and the at least one metal cation are present in a molar ratio of organic cations:metal cation in the range of about 1:3 to about 3:1, more preferably in the range of about 1:2 to about 2:1.

An embodiment provides an antiscale agent comprising an anionic polymer, the anionic polymer comprising recurring units of the formula (I) and recurring units of the formula (II), wherein $A^1$ is a group of the formula (III); $A^2$ is —$CH_2$—; $R^1$, $R^2$ and $R^3$ are each —H; $M_1^+$ is $^+NH_3C_2H_4OH$; $M_2^+$ is $Na^+$; $M_3^+$ comprises from about 40 mole % to about 60 mole % $^+NH_3C_2H_4OH$ and from about 60 mole % to about 40 mole % $H^+$; and the number of moles of recurring units of the formula (I) is approximately equal to the number of moles of recurring units of the formula (II). In a preferred embodiment, the anionic polymer consists essentially of such recurring units of the formula (I) and recurring units of the formula (II). In a preferred embodiment, about 60 mole % of $M_3^+$ is $^+NH_3C_2H_4OH$ and about 40 mole % of $M_3^+$ is $H^+$. Preferably, the weight average molecular weight of the anionic polymer is in the range of from about 1,000 to about 2,000.

An embodiment provides an antiscale agent comprising an anionic polymer, the anionic polymer comprising recurring units of the formula (I) and recurring units of the formula (II), wherein $A^1$ is a group of the formula (III); $A^2$ is $—CH_2—$; $R^1$, $R^2$ and $R^3$ are each $—H$; $M_1^+$ comprises from about 90 mole % to about 10 Mole % of $^+NH(C_2H_4OH)_3$ and from about 10 mole % to about 90 mole % of $^+NH_2(C_2H_4OH)_2$; $M_2^+$ is $Na^+$; $M_3^+$ comprises from about 40 mole % to about 60 mole % of a mixture of $^+NH(C_2H_4OH)_3$ and $^+NH_2(C_2H_4OH)_2$, and from about 60 mole % to about 40 mole % $H^+$; and the number of moles of recurring units of the formula (I) is approximately equal to the number of moles of recurring units of the formula (II). Preferably, the mixture of $^+NH(C_2H_4OH)_3$ and $^+NH_2(C_2H_4OH)_2$ comprises from about 90 mole % to about 10 mole % of $^+NH(C_2H_4OH)_3$ and from about 10 mole % to about 90 mole % of $^+NH_2(C_2H_4OH)_2$. In a preferred embodiment, the anionic polymer consists essentially of such recurring units of the formula (I) and recurring units of the formula (II). In a preferred embodiment, the mixture of $^+NH(C_2H_4OH)_3$ and $^+NH_2(C_2H_4OH)_2$ comprises about 85 mole % of $^+NH(C_2H_4OH)_3$ and about 15 mole % of $^+NH_2(C_2H_4OH)_2$. In a preferred embodiment, about 40 mole % of $M_3^+$ comprises such a mixture of $^+NH(C_2H_4OH)_3$ and $^+NH_2(C_2H_4OH)_2$ and about 60 mole % of $M_3^+$ is $H^+$. Preferably, the weight average molecular weight of the anionic polymer is in the range of from about 1,000 to about 2,000.

An embodiment provides an antiscale agent comprising an anionic polymer, the anionic polymer comprising recurring units of the formula (I) and recurring units of the formula (II), wherein $A^1$ is a group of the formula (III); $A^2$ is $—CH_2—$; $R^1$, $R^2$ and $R^3$ are each $—H$; $M_1^+$ is $^+NH_2(C_2H_4OH)_2$; $M_2^+$ is $Na^+$; $M_3^+$ comprises from about 40 mole % to about 60 mole % $^+NH_2(C_2H_4OH)_2$ and from about 60 mole % to about 40 mole % $H^+$; and the number of moles of recurring units of the formula (I) is approximately equal to the number of moles of recurring units of the formula (II). In a preferred embodiment, the anionic polymer consists essentially of such recurring units of the formula (I) and recurring units of the formula (II). In a preferred embodiment, about 40 mole % of $M_3^+$ is $^+NH_2(C_2H_4OH)_2$ and about 60 mole % of $M_3^+$ is $H^+$. Preferably, the weight average molecular weight of the anionic polymer is in the range of from about 1,000 to about 2,000.

An embodiment provides an antiscale agent comprising an anionic polymer, the anionic polymer comprising recurring units of the formula (I) and recurring units of the formula (II), wherein $A^1$ is a group of the formula (III); $A^2$ is $—CH_2—$; $R^1$, $R^2$ and $R^3$ are each $—H$; $M_1^+$ is $^+NH_3CH_3$; $M_2^+$ is $Na^+$; $M_3^+$ comprises from about 40 mole % to about 60 mole % $^+NH_3CH_3$ and from about 60 mole % to about 40 mole % $H^+$; and the number of moles of recurring units of the formula (I) is approximately equal to the number of moles of recurring units of the formula (II). In a preferred embodiment, the anionic polymer consists essentially of such recurring units of the formula (I) and recurring units of the formula (II). In a preferred embodiment, about 50 mole % of $M_3^+$ is $^+NH_3CH_3$ and about 50 mole % of $M_3^+$ is $H^+$. Preferably, the weight average molecular weight of the anionic polymer is in the range of from about 1,000 to about 2,000.

An embodiment provides an antiscale agent comprising an anionic polymer, the anionic polymer comprising recurring units of the formula (I) and recurring units of the formula (II), wherein $A^1$ is a group of the formula (III); $A^2$ is $—CH_2—$; $R^1$, $R^2$ and $R^3$ are each $—H$; $M_1^+$ is $^+NH_2(CH_3)_2$; $M_2^+$ is $Na^+$; $M_3^+$ comprises from about 40 mole % to about 60 mole % $^+NH_3CH_3$ and from about 60 mole % to about 40 mole % $H^+$; and the number of moles of recurring units of the formula (I) is approximately equal to the number of moles of recurring units of the formula (II). In a preferred embodiment, the anionic polymer consists essentially of such recurring units of the formula (I) and recurring units of the formula (II). In a preferred embodiment, about 60 mole % of $M_3^+$ is $^+NH_2(CH_3)_2$ and about 40 mole % of $M_3^+$ is $H^+$. Preferably, the weight average molecular weight of the anionic polymer is in the range of from about 1,000 to about 2,000.

In addition to the anionic polymer comprising recurring units of the formula (I) and recurring units of the formula (II) as described above, the antiscale agent may further comprise optional ingredients such as water, salts, oils, surfactants, pH adjusting agents (such as acids, bases and buffers), colorants, flow modifiers, etc. The antiscale agent may consist essentially of the anionic polymer, e.g., in a dry form. In an embodiment, the antiscale agent is an aqueous antiscale agent. that comprises water, in which case the polymer may be combined with the water in various ways, e.g., dissolved, suspended, dispersed or emulsified in the water. The amount of water in the aqueous antiscale agents may vary over a broad range, e.g., an aqueous antiscale agent may comprise from about 20 weight % anionic polymer to about 80 weight % anionic polymer, based on total weight of aqueous antiscale agent. Aqueous antiscale agents may be prepared in various ways, e.g., by preparing the anionic polymer in an aqueous solution.

An antiscale agent comprising an anionic polymer may be prepared in various ways. In an embodiment, the anionic polymer is prepared by copolymerization of the comonomers corresponding to the recurring units of the formula (I) and (II) (and any other optional comonomers), the comonomers comprising the organic cations represented by $M_1^+$, $M_2^+$, $M_3^+$ and $M_4^+$. For example, the anionic polymer may be prepared by copolymerization of sodium vinyl sulfonate and the diethanolamine salt of acrylic acid. In another embodiment, an anionic polymer is prepared in a first stage or initial series of stages, then post-reacted in a second or later series of stages to form an anionic polymer comprising recurring units of the formula (I) and (II) (and any other optional comonomers). The post-reaction may involve neutralization of an acid group with an organic amine salt, replacement of an inorganic counterion with an organic counterion, and/or post-reaction of the polymer to form a recurring unit (e.g., hydrolysis of a maleic anhydride recurring unit to form a recurring unit of the formula (I) in which $A^1$ is a group of the formula (III) and in which $R^1$ and $R^3$ are $—H$). Examples 4-8 below illustrate polymerization of maleic anhydride and allyl sulphonic acid (sodium salt), followed by hydrolysis to form a copolymer of maleic acid and allyl sulphonic acid (sodium salt) and replacement of the sodium counterion with various organic counterions to form antiscale agents comprising anionic polymers that contain recurring units of the formula (I) and recurring units of the formula (II).

Methods of Treating Scale

The antiscale agents described herein may be used for various purposes, including for the treatment of scale in aqueous systems. In this context, "treatment of scale" will be understood by those skilled in the art to have a broad and customary meaning that includes using the antiscale agents to reduce the amount of scale and/or reduce the rate of formation of scale in various aqueous systems, as compared to comparable aqueous systems that do not contain the antiscale agent. Thus, an embodiment provides a method for treating scale, comprising adding an antiscale agent as described herein to an aqueous system in need of scale treatment, in an amount effective to reduce or inhibit scale in the aqueous system. Methods for identifying aqueous systems in need of scale treatment are known to those skilled in the art.

A broad variety of aqueous systems may be treated to reduce scale using the methods described herein. Non-limiting examples of such aqueous systems include boiler water, cooling water, seawater (e.g., in oil platform applications), brackish water, oilfield water (e.g., topside and/or downhole), municipal treatment plant water, and industrial treatment plant water. The amount of antiscale agent that is effective to reduce or inhibit scale in a particular aqueous system may be determined by routine experimentation in light of the guidance provided herein. The amount of antiscale agent added to the aqueous system may vary over a broad range, depending on the nature of the aqueous system and the type of scale. For example, the amount of antiscale agent added to the aqueous system may be in the range of about 0.1 part per million to about 50,000 parts per million, by weight based on the capacity of the aqueous system. Various kinds of scale may be treated in accordance with the methods described herein, including without limitation sulfate, carbonate and phosphate salts such as calcium carbonate, calcium sulfate, calcium phosphate, barium sulfate, strontium sulfate, vivianite ($Fe_3(PO_4)_3.8H_2O$), and struvite ($MgNH_4PO_4.6H_2O$). An embodiment provides a method for treating scale, comprising adding an antiscale agent as described herein to boiler water in need of scale treatment, in an amount effective to reduce or inhibit scale in the boiler water. In an embodiment, the boiler water scale comprises a calcium phosphate.

Another embodiment provides a method for treating scale, comprising adding an antiscale agent as described herein to cooling water in need of scale treatment, in an amount effective to reduce or inhibit scale in the cooling water. For example, the antiscale agent may be added to the water used in a cooling tower. In an embodiment, the cooling water scale comprises a calcium carbonate.

Another embodiment provides a method for treating scale, comprising adding an antiscale agent as described herein to at least one of brackish water and seawater in need of scale treatment, in an amount effective to reduce or inhibit scale in the brackish water and/or seawater. For example, the antiscale agent may be added to the process water of a desalination plant. In an embodiment, the brackish water and/or seawater scale comprises a calcium carbonate.

Another embodiment provides a method for treating scale, comprising adding an antiscale agent as described herein to oilfield water in need of scale treatment, in an amount effective to reduce or inhibit scale in the oilfield water. For example, the antiscale agent may be added to process water on an oil platform. The oilfield water may be downhole water that is pumped underground (e.g., for enhanced oil recovery) and/or may be used to treat topside oilfield water. In an embodiment, the oilfield water scale comprises a sulfate salt, e.g., barium sulfate and/or strontium sulfate.

Another embodiment provides a method for treating scale, comprising adding an antiscale agent as described herein to municipal treatment plant water in need of scale treatment, in an amount effective to reduce or inhibit scale in the municipal treatment plant water. For example, the antiscale agent may be added to the process water of a plant that treats water to render it suitable for municipal drinking water, and/or to a plant that treats municipal wastewater. In an embodiment, the municipal treatment plant water scale comprises a phosphate, e.g., at least one of struvite and vivianite.

Methods of Increasing Biodegradability of an Anionic Polymer

Methods for improving the biodegradability of anionic polymers have now been developed that involve replacing the inorganic counterion of an anionic polymer with an organic counterion. For example, an embodiment provides a method of increasing the biodegradability of an anionic polymer, comprising: selecting an anionic polymer that comprises at least one anionic recurring unit and at least one inorganic counterion, the anionic polymer having a first degree of biodegradability; and preparing a modified version of the anionic polymer in which at least a portion of the inorganic counterion is replaced by an organic counterion, the modified version having a second degree of biodegradability that is higher than the first degree of biodegradability. The second degree of biodegradability is preferably at least about 10% higher than the first degree of biodegradability, more preferably at least about 20% higher, even more preferably at least about 50% higher. In various embodiments, the modified version of the anionic polymer comprises the at least one organic counterion in an amount of at least about 5 mole %, at least about 10 mole %, at least about 20 mole %, at least about 30 mole %, at least about 40 mole %, or at least about 50 mole %, based on total moles of the at least one anionic recurring unit. The amount of the at least one organic cation and the number of moles of the at least one anionic recurring unit may be determined by NMR spectroscopy in a manner generally known to those skilled in the art, and/or by knowledge of the reactants and reaction conditions used to make the modified version of the anionic polymer.

The first degree of biodegradability and the second degree of biodegradability may each individually be measured in accordance with any of the standard test methods for biodegradability, including: OECD Guidelines for Testing of Chemicals, 1992, 306, or any of the four protocols (known to those skilled in the art as "Marine BODIS Test," "OECD Guideline 306 Closed Bottle Test," "Marine $CO_2$ Headspace Biodegradation Test," and "Marine $CO_2$ Evolution Test) described in the report "Biodegradability of chemicals in sea water. Results of a ring tests undertaken by OSPARCOM, were reported by Elf Akvamiljö, September 1996." It has been determined that each of these test methods gives comparable results. In the event that the test methods are found to give significantly different results, the Marine BODIS test is to be used to determine both the first degree of biodegradability and the second degree of biodegradability of the anionic polymers.

The anionic polymer selected for biodegradability improvement comprises at least one inorganic counterion, and thus may be any anionic polymer, e.g., an anionic polymer for which it is desirable to improve biodegradability. In an embodiment, the selected anionic polymer is a component of an antiscale agent. For example, the selected anionic polymer or version thereof may be a component of a commercially available antiscale agent, such as a sulfonic acid/acrylic acid copolymer that comprises a counterion such as sodium and/or potassium.

an embodiment, a modified version of the selected anionic polymer is prepared in which at least a portion of the inorganic counterion is replaced by an organic counterion. The organic counterion may be selected from the group consisting of $^+NH_3R^4$, $^+NH_2(R^4)(R^5)$, $^+NH(R^4)(R^5)(R^6)$ and $^+N(R^4)(R^5)(R^6)(R^7)$, wherein $R^4$, $R^5$, $R^6$ and $R^7$ are each individually —$C_nH_{2n}R^8$, and wherein n is an integer in the range of 1 to 10 and $R^8$ is —H or —OH. In an embodiment, the modified version of the anionic polymer comprises recurring units of the formula (I) and recurring units of the formula (II):

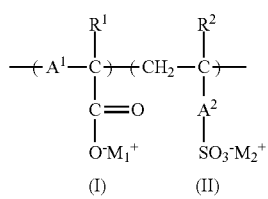

(I)                    (II)

wherein $A^1$ is —$CH_2$— or a group of the formula (III):

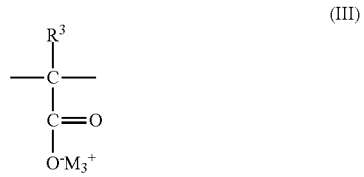

$A^2$ is —$CH_2$—, —$C(=O)NHC(CH_3)_2CH_2$—, or a bond; $R^1$, $R^2$ and $R^3$ are each individually —$CH_3$ or —H; and at least one of $M_1^+$, $M_2^+$ and $M_3^+$ is an organic cation. In an embodiment, the modified version of the anionic polymer is any of the anionic polymers described herein, including those that comprise a recurring unit of the formula (IV) or (V). Aside from the differences resulting from replacement of the inorganic counterions with organic counterions, the selected anionic polymer is typically similar to the modified version of the anionic polymer. In an embodiment, the modified version of the anionic polymer is substantially identical to the selected anionic polymer (aside from the differences resulting from replacement of the inorganic counterions with organic counterions), although it need not be identical. Thus, the differences between the selected anionic polymer and the modified version of the selected anionic polymer are not necessarily limited to the identity and content of the counterions, but may include additional modifications, particularly those that provide improved antiscale performance.

The modified version of the selected anionic polymer may be prepared in various ways. In an embodiment, the modified version of the selected anionic polymer is prepared by copolymerization of the comonomers corresponding to the recurring units of the formula (I) and (II) (and any other optional comonomers), the comonomers comprising the organic cations represented by $M_1^+$, $M_2^+$, $M_3^+$ and $M_4^+$. For example, the modified version of the selected anionic polymer may be prepared by copolymerization of sodium vinyl sulfonate and the diethanolamine salt of acrylic acid. In another embodiment, an anionic polymer (which may be similar to the selected anionic polymer) is prepared in a first stage or initial series of stages, then post-reacted in a second or later series of stages to form the modified version of the selected anionic polymer, preferably comprising recurring units of the formula (I) and (II) (and any other optional comonomers). The post-reaction may involve neutralization of an acid group with an organic amine salt, replacement of all inorganic counterion with an organic counterion, and/or post-reaction of the polymer to form a recurring unit (e.g., hydrolysis of a maleic anhydride recurring unit to form a recurring unit of the formula (I) in which $A^1$ is a group of the formula (III) and in which $R^1$ and $R^3$ are —H).

The examples below illustrate the selection (and preparation) of anionic polymers that comprise at least one inorganic counterion (Examples 2C and 3), and the preparation of modified versions of those polymers in which at least a portion of the inorganic counterions are replaced by organic counterions (Examples 4-8). Example 9 illustrates the first degree of biodegradability of the selected polymers (Examples 2C and 3) and the various higher second degrees of biodegradability exhibited by the modified versions (Examples 4-8).

EXAMPLES

Examples 1-8 describe the preparation of a series of antiscalants that comprise anionic polymers. Example 2C illustrates the preparation of a control anionic polymer comprising a potassium counterion, Example 3 illustrates the preparation of a polymer comprising an ammonium counterion, and Examples 4-8 illustrate the preparation of polymers that comprise organic cations. Example 9 shows the biodegradability of the anionic polymers of Examples 2-8 relative to the biodegradability of the control anionic polymer of Example 2C as determined by Marine BODIS, and illustrates the extent to which the organic counterions improve biodegradability.

Example 1C

A copolymer of maleic acid and allyl sulphonic acid (sodium salt) is prepared as follows: To a suitable four-neck glass flask fitted with a stirrer, a condenser and thermometer, are added 493 grams (g) of sodium allyl sulphonate (25% solution in water), 7.3 g of 40% tetra sodium ethylene diamine tetra-acetic acid (EDTA) solution, and 84 g of maleic anhydride. The mixture is heated and stirred until the temperature of the solution is 100-105° C. and 56 g of water is distilled off. About 20 milliliters (mL) of ammonium persulphate (42%) solution is added via a peristaltic pump at a constant rate over a three hour period, while maintaining the temperature of the flask at 100-105° C. The contents of the flask are held at 100-105° C. under reflux conditions for a further two hours. The final solution is allowed to cool. The resulting solution contains about 39.5 weight % of an approximately 1:1 (molar) copolymer of maleic acid and allyl sulphonic acid (sodium salt), a polymer of the formula (I) in which $A^1$ is a group of the formula (III); $A^2$ is —$CH_2$—; $R^1$, $R^2$ and $R^3$ are each —H; $M_1^+$ and $M_3^+$ are each H$^+$; $M_2^+$ is Na$^+$; and in which the number of moles of recurring units of the formula (I) is approximately equal to the number of moles of recurring units of the formula (II).

Example 2C

A control sample of an antiscalant is prepared by reacting 74.1 grams (g) of the copolymer of Example 1C with 25.9 g of 36% potassium hydroxide solution. The reaction is carried out in a stirred beaker and the addition rate of the potassium hydroxide solution is controlled to ensure that the temperature does not exceed about 30° C. The resulting solution contains about 35.8 weight % of a polymer of the formula (I) in which $A^1$ is a group of the formula (III); $A^2$ is —$CH_2$—; $R^1$, $R^2$ and $R^3$ are each —H; $M_1^+$ and $M_3^+$ are each K$^+$; $M_2^+$ is Na$^+$; and in which the number of moles of recurring units of the formula (I) is approximately equal to the number of moles of recurring units of the formula (II).

Example 3

A copolymer of maleic acid and allyl sulphonic acid (sodium salt) is prepared as described in Example 1C. About 200 g of this copolymer is reacted with 32.5 g of ammonia (specific gravity 0.91) in a stirred beaker in a water/ice bath to form an ammonium salt of the copolymer. The ammonia is added at a controlled rate such that the reaction temperature does not exceed about 30° C. The resulting solution contains about 37.5 weight % of a polymer of the formula (I) in which $A^1$ is a group of the formula (III); $A^2$ is —$CH_2$—; $R^1$, $R^2$ and $R^3$ are each —H; $M_1^+$ is $^+NH_4$; $M_2^+$ is $Na^+$; about 60 mole % of $M_3^+$ is 4 and about 40 mole % of $M_3^+$ is $H^+$; and in which the number of moles of recurring units of the formula (I) is approximately equal to the number of moles of recurring units of the formula (II). The amount of ammonium ($^+NH_4$) in the polymer is about 9.3% by weight based on total polymer weight.

Example 4

A copolymer of maleic acid and allyl sulphonic acid (sodium salt) is prepared as described in Example 1C. About 200 g of this copolymer is reacted with 32.2 g of monoethanolamine (90%) in a stirred beaker in a water/ice bath to form an organic monoethanolamine salt of the copolymer. The monoethanolamine is added at a controlled rate such that the reaction temperature does not exceed about 30° C. The resulting solution contains about 46.5 weight % of a polymer of the formula (I) in which $A^1$ is a group of the formula (III); $A^2$ is —$CH_2$—; $R^1$, $R^2$ and $R^3$ are each —H; $M_1^+$ is $^+NH_3C_2H_4OH$; $M_2^+$ is $Na^+$; about 60 mole % of $M_3^+$ is $^+NH_3C_2H_4OH$ and about 40 mole % of $M_3^+$ is $H^+$; and in which the number of moles of recurring units of the formula (I) is approximately equal to the number of moles of recurring units of the formula (II). The amount of $^+NH_3C_2H_4OH$ (organic cation) in the polymer is about 26.9% by weight based on total polymer weight, and about 80 mole % based on total moles of recurring units of the formulae (I) and (II).

Example 5

A copolymer of maleic acid and allyl sulphonic acid (sodium salt) is prepared as described in Example 1. About 200 g of this copolymer is diluted with about 163 g of water in a stirred beaker in a water/ice bath. About 65.7 g of triethanolamine (commercial grade containing about 85% triethanolamine and about 15% diethanolamine) is added at a controlled rate such that the temperature of the reaction does not exceed about 30° C., to form an organic triethanolamine salt of the copolymer. The resulting solution contains about 33.8 weight % of a polymer of the formula (I) in which $A^1$ is a group of the formula (III); $A^2$ is —$CH_2$—; $R^1$, $R^2$ and $R^3$ are each —H; $M_1^+$ is an approximately 85:15 (molar) mixture of $^+NH(C_2H_4OH)_3$ and $^+NH_2(C_2H_4OH)_2$; $M_2^+$ is $Na^+$; about 40 mole % of $M_3^+$ is an approximately 85:15 (molar) mixture of $^+NH(C_2H_4OH)_3$ and $^+NH_2(C_2H_4OH)_2$ and about 60 mole % of $M_3^+$ is $H^+$; and in which the number of moles of recurring units of the formula (I) is approximately equal to the number of moles of recurring units of the formula (II). The total amount of $^+NH(C_2H_4OH)_3$ and $^+NH_2(C_2H_4OH)_2$ (organic cations) in the polymer is about 45.2% by weight based on total polymer weight, and about 70 mole % based on total moles of recurring units of the formulae (I) and (II).

Example 6

A copolymer of maleic acid and allyl sulphonic acid (sodium salt) is prepared as described in Example 1. About 200 g of this copolymer is reacted with 33.9 g of monomethylamine (40%) in stirred beaker in a water/ice bath to form an organic monomethylamine salt of the copolymer. The monomethylamine is added at a controlled rate such that the reaction temperature does not exceed about 30° C. The resulting solution contains about 39.6 weight % of a polymer of the formula (I) in which $A^1$ is a group of the formula (III); $A^2$ is —$CH_2$—; $R^1$, $R^2$ and $R^3$ are each —H; $M_1^+$ is $^+NH_2(C_2H_4OH)_2$; $M_2^+$ is $Na^+$; about 40 mole % of $M_3^+$ is $^+NH_2(C_2H_4OH)_2$ and about 60 mole % of $M_3^+$ is $H^+$; and in which the number of moles of recurring units of the formula (I) is approximately equal to the number of moles of recurring units of the formula (II). The amount of $^+NH_2(C_2H_4OH)_2$ (organic cation) in the polymer is about 14.6% by weight based on total polymer weight, and about 70 mole % based on total moles of recurring units of the formulae (I) and (II).

Example 7

A copolymer of maleic acid and allyl sulphonic acid (sodium salt) is prepared as described in Example 1. About 200 g of this copolymer is reacted with 46.9 g of diethanolamine (99%) in stirred beaker in a water/ice bath to form an organic diethanolamine salt of the copolymer. The diethanolamine is added at a controlled rate such that the reaction temperature does not exceed about 30° C. The resulting solution contains about 50.8 weight % of a polymer of the formula (I) in which $A^1$ is a group of the formula (III); $A^2$ is —$CH_2$—; $R^1$, $R^2$ and $R^3$ are each —H; $M_1^+$ is $^+NH_3CH_3$; $M_2^+$=$Na^+$; about 50 mole % of $M_3^+$ is $^+NH_3CH_3$ and about 50 mole % of $M_3^+$ is $H^+$; and in which the number of moles of recurring units of the formula (I) is approximately equal to the number of moles of recurring units of the formula (II). The amount of $^+NH_3CH_3$ (organic cation) in the polymer is about 37.0% by weight based on total polymer weight, and about 75 mole % based on total moles of recurring units of the formulae (I) and (II).

Example 8

A copolymer of maleic acid and allyl sulphonic acid (sodium salt) is prepared as described in Example 1. About 200 g of this copolymer is reacted with 32.4 g of dimethylamine (60%) in a stirred beaker in a water/ice bath to form an organic dimethylamine salt of the copolymer. The dimethylamine is added at a controlled rate such that the temperature of the reaction does not exceed about 30° C. The resulting solution contains about 42.4 weight % of a polymer of the formula (I) in which $A^1$ is a group of the formula (III); $A^2$ is —$CH_2$—; $R^1$, $R^2$ and $R^3$ are each —H; $M_1^+$ is $^+NH_2(CH_3)_2$; $M_2^+$=$Na^+$; about 60 mole % of $M_3^+$ is $^+N_2(CH_3)_2$ and about 40 mole % of $M_3^+$ is $H^+$; and in which the number of moles of recurring units of the formula (I) is approximately equal to the number of moles of recurring units of the formula (II). The amount of $^+NH_2(CH_3)_2$ (organic cation) in the polymer is about 19.7% by weight based on total polymer weight, and about 80 mole % based on total moles of recurring units of the formulae (I) and (II).

Example 9

The biodegradability of the antiscalants of Examples 2-8 is determined by the Marine BODIS biodegradation test using the theoretical oxygen demand (ThOD) values as shown in Table 1. The Marine BODIS biodegradation tests are conducted by a commercial testing laboratory (Opus Plus Limited, United Kingdom) in accordance with the test protocol described in the report "Biodegradability of chemicals in sea water. Results of a ring tests undertaken by OSPARCOM, were reported by Elf Akvamiljö, September 1996" that is referenced in the OSPAR Guidelines for Completing the Harmonised Offshore Chemical Notification Format (HOCNF) (Reference number: 2005-13). The Marine BODIS test involves exposing the test substance to an oxygenated and nutrient-enriched sample of natural seawater sample and monitoring the degradation of the test substance by measuring the change in dissolved oxygen in the sample over the course of 28 days under controlled conditions. The extent of biodegradation is calculated by dividing the net oxygen depletion values by the predicted 100% biodegradation values (i.e., the product of the ThOD and the concentration of test substance).

Example 10

Synthesis of Terpolymer of Vinylsulfonate Sodium Salt, Maleic Anhydride and Acrylic Acid. A suitable vessel equipped with a mechanical stirrer, reflux condenser, Harvard Syringe Pump was charged with 325.7 parts of a 35% aqueous solution of vinylsulfonate sodium salt and 1.64 parts of a 0.1% aqueous solution of sodium hypophosphite hydrate. The mixture was heated around 55° C. 29 parts maleic anhydride was added and mixed. After completion of dissolution, the mixture was heated to around 70° C. The polymerization was started by adding 60 parts of 35% ammonium persulfate solution with a flow rate of 0.222 ml/min and simultaneously by adding 21.3 parts of acrylic acid with a flow rate of 0.178 ml/min. After completion of acrylic acid addition within two hours, the mixture was raised to 100° C. by continuous addition of ammonium persulfate solution. After completion of ammonium persulfate solution within about 4 hours and 30 mins, an addition 30 mins at this temperature, the mixture was cooled to ambient. The polymer solids was 39.2%. A uniform yellowish solution was obtained. The conversion was greater than 99%. $C^{13}$NMR shows no residual monomer and the expected chemical composition of VSA/MAC/AA (60/20/20 M %) was obtained. The polymer solution was diluted into as is 15% solids in 1N NaCl to give a Brookfield viscosity (UL adapter, 60 rpm at 25° C.) to give 2.61 cps. The empirical formula is $C_{5.2}.H_{6.8}O_{6.0}S_{1.2}Na_{1.2}$ and MW is 231.2 g/mole.

A 185 parts of polymer solution was neutralized with a 24.5 parts of 90% ethanolamine to pH of 6. The polymer solids of 45.1% was obtained. The empirical formula is $C_{7.5}.H_{14.9}O_{7.2}N_{1.2}S_{1.2}Na_{1.2}$ and MW is 301.2 g/mole. The theoretical oxygen demand (ThOD) is 0.72

Example 11

Synthesis of Copolymer of Vinylsulfonate Sodium Salt and Acrylic Acid. A suitable vessel equipped with a mechanical stirrer, reflux condenser, Harvard Syringe Pump was charged with 302.1 parts of a 35% aqueous solution of vinylsulfonate sodium salt and 7 parts of sodium hypophosphite hydrate. After completion of dissolution, the mixture was heated around 70° C. The polymerization was started by adding 60 parts of 35% ammonium persulfate solution with a flow rate of 0.222 ml/min and simultaneously by adding 58.6 parts of acrylic acid with a flow rate of 0.488 ml/min. After completion of acrylic acid addition within two hours, the mixture was raised to 100° C. by continuous addition of ammonium persulfate solution. After completion of ammonium persulfate solution within about 4 hours and 30 mins, and an additional 30 mins at this temperature, the mixture was cooled to ambient. The polymer solids was 37.97%. A uniform yellowish solution was obtained. The conversion was greater than 99%. $C^{13}$NMR shows no residual monomer and the expected chemical composition of VSA/AA (50.8/49.2 M %) was obtained. The polymer solution was diluted into as is 15% solids in 1N NaCl to give a Brookfield viscosity (UL adapter, 60 rpm at 25° C.) of 2.86 cps. The empirical formula is $C_5.H_7O_5S_1Na_1$ and MW is 202 g/mole.

A 206.3 parts of polymer solution was neutralized with a 30.26 parts of 90% ethanolamine to pH of 6. The polymer solids of 44.6% was obtained. The empirical formula is $C_{7.3}.H_{15.1}O_{6.2}N_{1.2}S_1Na_1$ and MW is 330.2 g/mole. The theoretical oxygen demand (ThOD) is 0.69

Example 12

Synthesis of Copolymer of Allylsulfonate Sodium Salt and Acrylic Acid. A suitable vessel equipped with a mechanical stirrer, reflux condenser, Harvard Syringe Pump was charged with 390 parts of a 30% aqueous solution of allylsulfonate sodium salt. The aqueous solution was heated around 70° C. The polymerization was started by adding 60 parts of 35% ammonium persulfate solution with a flow rate of 0.222 ml/min and simultaneously by adding 58.6 parts of acrylic acid with a flow rate of 0.488 ml/min. After completion of acrylic acid addition within two hours, the mixture was raised to 100° C. by continuous addition of ammonium persulfate solution. After completion of ammonium persulfate solution within about 4 hours and 30 mins, and an additional 30 mins at this temperature, the mixture was cooled to ambient. The polymer solids was 34.8%. A uniform amber solution was obtained. The conversion was greater than 99%. $C^{13}$NMR shows no residual monomer and the expected chemical composition of SAS/AA (50/50 M %) was obtained. The polymer solution was diluted into as is 15% solids in 1N NaCl to give a Brookfield viscosity (UL adapter, 60 rpm at 25° C.) of 2.27 cps. The empirical formula is $C_6.H_9O_5S_1Na_1$ and MW is 216 g/mole.

A 180 parts of polymer solution was neutralized with a 20.2 parts of 90% ethanolamine to pH of 6. The polymer solids of 40.4% was obtained. The empirical formula is $C_{8.0}.H_{16.2}O_{6.0}N_1S_1Na_1$ and MW is 278.65 g/mole. The theoretical oxygen demand (ThOD) is 0.96.

Example 13

Synthesis of Terpopolymer of Allylsulfonate Sodium Salt, Maleic Anhydride and Allylphosphonic Acid Diethyl Ester. A suitable vessel equipped with a mechanical stirrer, reflux condenser, Harvard Syringe Pump was charged with 452.3 parts of a 25% aqueous solution of allylsulfonate sodium salt. The solution was heated around 55° C. A 77 parts maleic anhydride was added and mixed. After completion of dissolution, the mixture was heated around reflux to strip and collect 33.2 g condensate. Then the mixture was cool around 80° C. A 31 parts of allylphosphonic acid diethyl ester was charged to the reactor. The mixture was raised to 100° C. and then the polymerization was started by adding 76 parts of 20% ammonium persulfate solution with a flow rate of 0.253 ml/min. After completion of ammonium persulfate solution addition within about five hours, and an additional 30 mins at this temperature, the mixture was cooled to ambient. The polymer solids was 39.0%. A crystal clear yellowish solution was obtained. The conversion was greater than 99%. $C^{13}$NMR shows no residual monomer and the expected chemical composition of SAS/MAC/DEAP (44.1/45.6/10.2 M %) was obtained. The polymer solution was diluted into to 15% solids in 1N NaCl to give a Brookfield viscosity (UL adapter, 60 rpm at 25° C.) of 1.97 cps. The empirical formula is $C_{7.7}.H_{11.1}O_{6.9}S_{0.9}Na_{0.9}P_{0.2}$ and MW is 269.6 g/mole.

A 200 parts of polymer solution was neutralized with a 34.6 parts of 90% ethanolamine to pH of 6. The polymer solids of 46.5% was obtained. The empirical formula is $C_{11.2}H_{23.5}O_{8.7}N_{1.8}S_{0.9}Na_{0.9}N_{0.2}$ and MW is 377.2 g/mole. The theoretical oxygen demand (ThOD) is 0.97.

The percentage increase in the biodegradability of the antiscalants of Examples 3-8 and 10-13, relative to the biodegradability of the control antiscalant of Example 2C, is shown in Table 1. Table 1 illustrates improvements in the biodegradability of antiscalants obtained by replacing metal counterions (Example 2C) with organic counterions (Examples 4-8).

TABLE 1

| Example No. | ThOD (mg $O_2$/mg) | Relative Increase in Biodegradability (28 day Marine BODIS) |
| --- | --- | --- |
| 2C | 0.56 | 0 |
| 3 | 0.64 | 111% |
| 4 | 0.85 | 533% |
| 5 | 1.12 | 56% |
| 6 | 0.83 | 211% |
| 7 | 1.01 | 428% |
| 8 | 1.01 | 656% |
| 10 | 0.72 | 844% |
| 11 | 0.69 | 800% |
| 12 | 0.96 | 411% |
| 13 | 0.97 | 467% |

It will be appreciated by those skilled in the art that various omissions, additions and modifications may be made to the compositions and processes described above without departing from the scope of the invention, and all such modifications and changes are intended to fall within the scope of the invention.

What is claimed is:

1. A method for treating scale, comprising adding an antiscale agent comprising an anionic polymer to an aqueous system in need of scale treatment, in an amount effective to reduce or inhibit scale in the aqueous system; wherein the anionic polymer comprises recurring units of the formula (I) and recurring units of the formula (II):

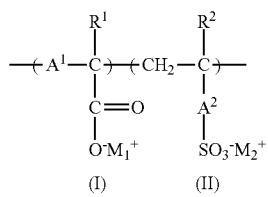

wherein:

$A^1$ is —$CH_2$— or a group of the formula (III):

$A^2$ is —$CH_2$—, —C(=O)NHC($CH_3$)$_2$$CH_2$—, or a bond; $R^1$, $R^2$ and $R^3$ are each individually —$CH_3$ or —H; and at least one of $M_1^+$, $M_2^+$ and $M_3^+$ is an organic cation, the organic cations represented by $M_1^+$, $M_2^+$ and $M_3^+$ together being present in an amount that is effective to increase the biodegradability of the anionic polymer greater than 56% relative to a comparable anionic polymer in which $M_1^+$, $M_2^+$ and $M_3^+$ are inorganic cations; wherein at least one of $M_1^+$, $M_2^+$, and $M_3^+$ is selected from the group consisting of $^+NH_3(CH_3)$, $^+NH_2(CH_3)_2$, $^+NH_3(CH_2CH_2OH)$, $^+NH_2(CH_2CH_2OH)_2$, and mixtures thereo;

and wherein the anionic polymer comprises at least one metal cation.

2. The method of claim 1, comprising adding the antiscale agent to the aqueous system in an amount in the range of about 0.1 part per million to about 50,000 parts per million, by weight based on capacity of the aqueous system.

3. The method of claim 1, wherein the aqueous system is selected from the group consisting of boiler water, cooling water, seawater, brackish water, oilfield water, municipal treatment plant water, and industrial treatment plant water.

4. The method of claim 3, wherein the aqueous system is boiler water.

5. The method of claim 4, wherein the aqueous system comprises a calcium phosphate.

6. The method of claim 3, wherein the aqueous system is cooling water.

7. The method of claim 6, wherein the aqueous system comprises a calcium carbonate.

8. The method of claim 3, wherein the aqueous system comprises at least one of seawater and brackish water.

9. The method of claim 8, wherein the aqueous system comprises a calcium carbonate.

10. The method of claim 8, wherein the aqueous system is desalination plant process water.

11. The method of claim 3, wherein the aqueous system comprises oilfield water.

12. The method of claim 11, wherein the oilfield water is topside.

13. The method of claim 11, wherein the oilfield water is downhole.

14. The method of claim 11, wherein the oilfield water comprises a sulfate salt.

15. The method of claim 14, wherein the sulfate salt comprises at least one of barium sulfate and strontium sulfate.

16. The method of claim 3, wherein the aqueous system is municipal treatment plant water.

17. The method of claim 16, wherein the aqueous system comprises a phosphate.

18. The method of claim 17, wherein the phosphate comprises at least one of struvite ($MgNH_4PO_4 \cdot 6H_2O$) and vivianite ($Fe_3(PO_4)_3 \cdot 8H_2O$).

19. A method of increasing the biodegradability of an anionic polymer, comprising:

selecting an anionic polymer that comprises at least one anionic recurring unit and at least one inorganic counterion, the anionic polymer having a first degree of biodegradability; and preparing a modified version of the anionic polymer in which at least a portion of the inorganic counterion is replaced by an organic counterion, the modified version having a second degree of biodegradability that is greater than 56% higher than the first or second degree of biodegradability;

wherein the organic counterion is selected from the group consisting of $^+NH_3(CH_3)$, $^+NH_2(CH_3)_2$, $^+NH_3(CH_2CH_2OH)$, $^+NH_2(CH_2CH_2OH)_2$, and mixtures thereof;

and wherein the modified version of the anionic polymer comprises at least one metal cation.

20. The method of claim 19, wherein the modified version of the anionic polymer comprises recurring units of the formula (I) and recurring units of the formula (II):

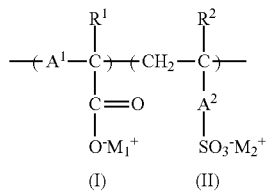

wherein:
A¹ is —CH₂— or a group of the formula (III):

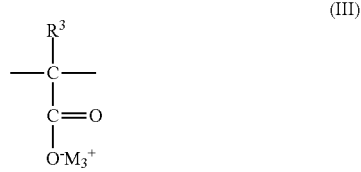

A² is —CH₂—, —C(═O)NHC(CH₃)₂CH₂—, or a bond;
R¹, R² and R³ are each individually —CH₃ or —H; and
at least one of $M_1^+$, $M_2^+$ and $M_3^+$ is an organic cation selected from the group consisting of $^+NH_3(CH_3)$, $^+NH_2(CH_3)_2$, $^+NH_3(CH_2CH_2OH)$, $^+NH_2(CH_2CH_2OH)_2$, and mixtures thereof;
and wherein the anionic polymer comprises at least one metal cation.

21. The method of claim 19, wherein the selected anionic polymer is a component of an antiscale agent.

22. The method of claim 19, wherein the modified version of the anionic polymer comprises the at least one organic counterion in an amount of at least about 5 mole %, based on total moles of the at least one anionic recurring unit.

23. The method of claim 19, wherein the modified version of the anionic polymer comprises the at least one organic counterion in an amount of at least about 10 mole %, based on total moles of the at least one anionic recurring unit.

24. The method of claim 19, wherein the modified version of the anionic polymer comprises the at least one organic counterion in an amount of at least about 20 mole %, based on total moles of the at least one anionic recurring unit.

25. The method of claim 19, wherein the modified version of the anionic polymer comprises the at least one organic counterion in an amount of at least about 30 mole %, based on total moles of the at least one anionic recurring unit.

26. The method of claim 19, wherein the modified version of the anionic polymer comprises the at least one organic counterion in an amount of at least about 40 mole %, based on total moles of the at least one anionic recurring unit.

27. The method of claim 19, wherein the modified version of the anionic polymer comprises the at least one organic counterion in an amount of at least about 50 mole %, based on total moles of the at least one anionic recurring unit.

28. The method of claim 1, wherein the anionic polymer consists essentially of the recurring units of the formula (I) and recurring units of the formula (II).

29. The method of claim 1, wherein at least one of $M_1^+$, $M_2^+$, $M_3^+$, and $M_4^+$ is selected from the group consisting of $^+NH_3(CH_2CH_2OH)$, $^+NH_2(CH_2CH_2OH)_2$, and mixtures thereof.

30. The method of claim 19, wherein the organic cation is selected from the group consisting of $^+NH_3(CH_2CH_2OH)$, $^+NH_2(CH_2CH_2OH)_2$, and mixtures thereof.

31. The method of claim 1, wherein the organic cations represented by $M_1^+$, $M_2^+$, $M_3^+$ and $M_4^+$ and the at least one metal cation are present in a molar ratio of organic cations: metal cation in the range of about 1:3 to about 3:1.

32. The method of claim 1, wherein the organic cations represented by $M_1^+$, $M_2^+$, $M_3^+$ and $M_4^+$ and the at least one metal cation are present in a molar ratio of organic cations: metal cation in the range of about 1:2 to about 2:1.

33. The method of claim 1, wherein the organic cations represented by $M_1^+$, $M_2^+$, $M_3^+$ and $M_4^+$ are each individually selected from the group consisting of $^+NH_2(CH_3)_2$ and $^+NH_3(CH_2CH_2OH)$.

34. The method of claim 1, wherein the at least one metal cation is selected from Na⁺ or K⁺.

35. The method of claim 1, wherein the weight average molecular weight of the anionic polymer is in the range of about 1000 to about 2000.

36. The method of claim 20, wherein the organic cations represented by $M_1^+$, $M_2^+$, $M_3^+$ and $M_4^+$ and the at least one metal cation are present in a molar ratio of organic cations: metal cation in the range of about 1:3 to about 3:1.

37. The method of claim 20, wherein the organic cations represented by $M_1^+$, $M_2^+$, $M_3^+$ and $M_4^+$ and the at least one metal cation are present in a molar ratio of organic cations: metal cation in the range of about 1:2 to about 2:1.

38. The method of claim 20, wherein the organic cations represented by $M_1^+$, $M_2^+$, $M_3^+$ and $M_4^+$ are each individually selected from the group consisting of $^+NH_2(CH_3)_2$ and $^+NH_3(CH_2CH_2OH)$.

39. The method of claim 19, wherein the at least one metal cation is selected from Na⁺ or K⁺.

40. The method of claim 20, wherein the at least one metal cation is selected from Na⁺ or K⁺.

\* \* \* \* \*